(12) United States Patent
Basil

(10) Patent No.: US 9,565,188 B2
(45) Date of Patent: Feb. 7, 2017

(54) SYSTEM AND METHOD FOR DIGITALLY SIGNING DOCUMENTS FROM A MOBILE DEVICE

(71) Applicant: Axacore, Inc., San Diego, CA (US)

(72) Inventor: Nicholas J. Basil, San Diego, CA (US)

(73) Assignee: SCRYPT, INC, Austin, TX (US)

( * ) Notice: Subject to any disclaimer, the term of this patent is extended or adjusted under 35 U.S.C. 154(b) by 139 days.

(21) Appl. No.: 14/516,989

(22) Filed: Oct. 17, 2014

(65) Prior Publication Data

US 2015/0113282 A1   Apr. 23, 2015

Related U.S. Application Data

(60) Provisional application No. 61/892,376, filed on Oct. 17, 2013.

(51) Int. Cl.
*H04L 29/06* (2006.01)
*H04L 9/32* (2006.01)

(52) U.S. Cl.
CPC ......... *H04L 63/0876* (2013.01); *H04L 9/3247* (2013.01); *H04L 9/3297* (2013.01); *H04L 63/0861* (2013.01); *H04L 63/12* (2013.01); *H04L 2463/103* (2013.01)

(58) Field of Classification Search
None
See application file for complete search history.

(56) References Cited

U.S. PATENT DOCUMENTS

| | | | |
|---|---|---|---|
| 6,796,489 B2 | 9/2004 | Slater et al. | |
| 7,069,443 B2 | 6/2006 | Berringer et al. | |
| 7,533,268 B1 | 5/2009 | Catorcini et al. | |
| 7,568,101 B1 | 7/2009 | Catorcini et al. | |
| 7,581,105 B2 | 8/2009 | Dietl et al. | |
| 7,692,636 B2 | 4/2010 | Kim et al. | |
| 7,917,761 B2 | 3/2011 | Cahill et al. | |
| 7,958,364 B2 | 6/2011 | Lee et al. | |
| 8,065,527 B2 | 11/2011 | Veluchamy et al. | |
| 8,255,822 B2 | 8/2012 | Markiewicz et al. | |
| 8,402,276 B2 | 3/2013 | Berringer et al. | |
| 2009/0044019 A1* | 2/2009 | Lee | H04L 9/3239 713/176 |
| 2010/0031140 A1* | 2/2010 | Cummins | G06F 21/64 715/236 |
| 2011/0093777 A1 | 4/2011 | Dunn et al. | |
| 2012/0102547 A1 | 4/2012 | Fransdonk | |

(Continued)

FOREIGN PATENT DOCUMENTS

| | | |
|---|---|---|
| CN | 01364869 | 2/2009 |
| EP | 1496663 B1 | 4/2006 |

(Continued)

*Primary Examiner* — Amir Mehrmanesh
(74) *Attorney, Agent, or Firm* — J Curtis Edmondson; Law Office of J Curtis Edmondson

(57) ABSTRACT

A system and method for embedding a written signature into a secure electronic document is disclosed. In certain embodiments, a user views the electronic document on a first computing device and creates an electronic digital signature on a mobile computing device. The user is securely certified by a system created alphanumeric code and the identification of the mobile device. The signature is then embedded into the electronic document and stored securely on a central server.

15 Claims, 6 Drawing Sheets

(56) References Cited

U.S. PATENT DOCUMENTS

| | | |
|---|---|---|
| 2012/0190405 A1 | 7/2012 | Kumaran |
| 2012/0284591 A1 | 11/2012 | Seed et al. |
| 2013/0019156 A1 | 1/2013 | Gonser et al. |
| 2013/0050521 A1 | 2/2013 | Okamoto |
| 2014/0040135 A1 | 2/2014 | Ovick |
| 2014/0149735 A1* | 5/2014 | Tenenboym ............ H04L 63/12 713/156 |

FOREIGN PATENT DOCUMENTS

| | | |
|---|---|---|
| EP | 2020789 B1 | 11/2010 |
| JP | 2004-023406 | 1/2004 |
| JP | 2011-024155 A | 2/2011 |
| WO | WO-2010/112981 | 2/2011 |

* cited by examiner

SYSTEM AND METHOD FOR DIGITALLY SIGNING DOCUMENTS FROM A MOBILE DEVICE

CROSS-REFERENCE TO RELATED APPLICATIONS

The present application claims the benefit of the U.S. Provisional Patent Application No. 61/892,376, filed on Oct. 17, 2013 and entitled "System and Method for Digitally Signing Documents from a Mobile Device" which is herein incorporated by reference in its entirety.

BACKGROUND

The present inventive subject matter generally relates to digitally signing documents, and more particularly, is related to methods, systems and computer program products for digitally signing an electronic document with a user-entered signature image from a mobile computing device.

Digital documents are widespread in society today. However, at some point or another, it usually becomes necessary to print these documents in order to complete or execute them. Businesses, government agencies, and individuals are seeking methods of keeping documents in the digital domain for the life of the document, from cradle to grave. One reason this objective has evaded many is due to the need to sign documents in order to execute them.

Previous systems for digital signing require a user to pick a signing certificate from a non-intuitive list of computer signing certificates. Signing certificates may be purchased from a signing authority. However, there is no intuitive way to sign electronic documents. Most implementations show canned, generally textual only, representations. However, canned pictures of signatures are very different than the intuitive practice of actually taking a pen and writing or scrawling a signature on each signature line of a document.

Alternatively, conventional electronic signatures can be typewritten, such as the name between backslash characters, "/signature/". However, a problem with this technique is that such signatures are easy to forge and therefore present authentication concerns.

Finally, there is a need and demand to use mobile devices such as smartphones both for convenience and security purposes to electronically sign documents.

Accordingly there is an unaddressed need in the industry to address the aforementioned deficiencies and inadequacies.

DEFINITION OF TERMS

PDA: A personal digital assistant (PDA), also known as a palmtop computer, or personal data assistant, is a mobile device that functions as a personal information manager.

Smartphone: A smartphone is a mobile phone that offers more advanced computing ability and connectivity than a contemporary feature phone.

Touchscreen: A touchscreen is an electronic visual display that can detect the presence and location of a touch within the display area. The term generally refers to touching the display of the device with a finger or hand.

Gesture: A Gesture is a touch or movement on a computing or mobile device that operates as commands to the device or to software on the device.

Multi-Touch. The interaction of touch and movement on surfaces is a function on electronic visual displays and touchpad pointing devices to interact with content. It is an intermediary connection and detection method from hardware to computer software, to enact a user's intention.

Air Gesture: An Air Gesture is similar to a Gesture as defined above, except that there is no contact required on a touch screen display on a mobile device. An Air Gesture is able to use a screen on a portable electronic computing device without direct contact, and can perform all of the same functions performed by Gestures.

IMSI: The International Mobile Subscriber Identity or IMSI is a unique identification associated with all cellular networks. It is stored as a 64 bit field and is sent by the phone to the network. The IMSI is used in and mobile network that interconnects with other networks.

MIN, MSIN, MSID: The mobile identification number (MIN) or mobile subscription identification number (MSIN) refers to the 10-digit unique number that a wireless carrier uses to identify a mobile phone, which is the last part of the international mobile subscriber identity (IMSI).

MEID: A mobile equipment identifier (MEID) is a globally unique number identifying a physical piece of CDMA mobile station equipment. The number format is defined by the 3GPP2 report S.R0048 but in practical terms it can be seen as an IMEI but with hexadecimal digits.

MNC: A mobile network code (MNC) is used in combination with a mobile country code (MCC) (also known as a "MCC/MNC tuple") to uniquely identify a mobile phone operator/carrier using the GSM/LTE, CDMA, iDEN, TETRA and UMTS public land mobile networks and some satellite mobile networks.

IMEI: The International Mobile Station Equipment Identity or IMEI is a number, usually unique, to identify 3GPP (i.e., GSM, UMTS and LTE) and iDEN mobile phones, as well as some satellite phones. The IMEI number is used by a GSM network to identify valid devices and therefore can be used for stopping a stolen phone from accessing that network.

UDID: A unique device identifier (UDID) is a 40-character string assigned to certain Apple devices including the iPhone, iPad, and iPod Touch. Each UDID character is a numeral or a letter of the alphabet.

TMSI: The Temporary Mobile Subscriber Identity (TMSI) is the identity that is most commonly sent between the mobile and the network. TMSI is randomly assigned by the VLR to every mobile in the area, the moment it is switched on.

The network can also change the TMSI of the mobile at any time. And it normally does so, in order to avoid the subscriber from being identified, and tracked by eavesdroppers on the radio interface. A key use of the TMSI is in paging a mobile. "Paging" is the one-to-one communication between the mobile and the base station.

RUIM: Removable User Identity Module (R-UIM) is a card developed for cdmaOne/CDMA2000 ("CDMA") handsets that extends the GSM SIM card to CDMA phones and networks. To work in CDMA networks, the R-UIM contains an early version of the CSIM application.

GPS: The Global Positioning System (GPS) is a space-based satellite navigation system that provides location and time information in all weather conditions, anywhere on or near the Earth where there is an unobstructed line of sight to four or more GPS satellites.

MSCID: Mobile Switching Center Identification—unique number that is used in TIA-41 networks to identify an MSC. The MSCID is made up of a five-digit market ID field (usually the SID), which identifies the market, and a three-digit switch number, which identifies the switch in that market.

Input Device: In computing, an input device is any peripheral (piece of computer hardware equipment) used to provide data and control signals to an information processing system such as a computer or other information appliance.

MAC Address: A media access control address (MAC address) is a unique identifier assigned to network interfaces for communications on the physical network segment. MAC addresses are used as a network address for most IEEE 802 network technologies, including Ethernet. Logically, MAC addresses are used in the media access control protocol sub layer of the OSI reference model.

MAC addresses are most often assigned by the manufacturer of a network interface controller (NIC) and are stored in its hardware, such as the card's read-only memory or some other firmware mechanism.

Communication Identifiers: Any one of the above-defined terms: IMSI, MIN, MSIN, MSID, MEID, MNC, IMEI, TMSI, RUIM, MSCID and GPS.

SUMMARY OF THE INVENTION

In the present inventive subject matter, a system for electronically signing documents from a mobile device overcomes some or all of the drawbacks discussed above. The present invention is intended to provide a system and method for electronically signing documents from a mobile device, which allows users (signers) to use their mobile device to provide real signatures for documents while signing electronically and securely. One object of the present invention is to display a document for a user on a first computing device, where such document requires a signature in one or more places by the user.

Another object of the inventive subject matter is that the document is stored on a central service and access is provided to the user to view the document. Upon viewing the document the user highlights the signature sections by drawing a box or highlighting a signature field.

Another object of the inventive subject matter is to provide the user with an application on a mobile device where the user can create and store one or more personal signatures.

Signatures can be created by using an input device on a touch screen, such as a stylus, using a finger on the touchscreen to create a signature, take a picture of a signature made by pen or pencil on paper, or finally to use a finger with air gesturing where the user is creating a signature without actually touching the screen.

Another object of the inventive subject matter is to provide security to the system by having the central server generate a unique alphanumeric code for the user and have the code viewable on the document. The user then will input the alphanumeric code on their mobile device for the purposes of verification the user viewed the document and submitted a valid signature.

Another object of the inventive subject matter is to infuse the electronic signature into the document and lock the document for future edits, thus creating a valid signed document image that is stored on the server.

Another object of the inventive subject matter is to use one or more identifiers of the mobile device of the user to save as identification and validation of the user signature. Identifiers used are one or more of the following that are previously defined in the definition of terms section: IMEI, IMSI, RUIM, MSIN, MIN, MSID, MEID, UDID, TMSI, MNC, MSCID, GPS, MAC Address, and time and date of the capturing of the signature, or information provided in response to security requests of the signature application.

Another object of the inventive subject matter is that the first computing device and the mobile device may be the same device.

A final object of the inventive subject matter is to provide an electronic signature service, in which a first user requests a signature of a second user, the second user accesses the document to sign on the central server, uses a provided application on a second mobile device to capture a signature and submit the signature with the alphanumeric security code to the central server, and store the document for the first user.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views and wherein.

DETAILED DESCRIPTION OF THE INVENTION

Although the detailed description herein contains many specifics for the purposes of illustration, anyone of ordinary skill in the art will appreciate that many variations and alterations to the following details are within the scope of the embodiments described herein. Thus, the following illustrative embodiments are set forth without any loss of generality to, and without imposing limitations upon, the claimed invention.

Figure 1:
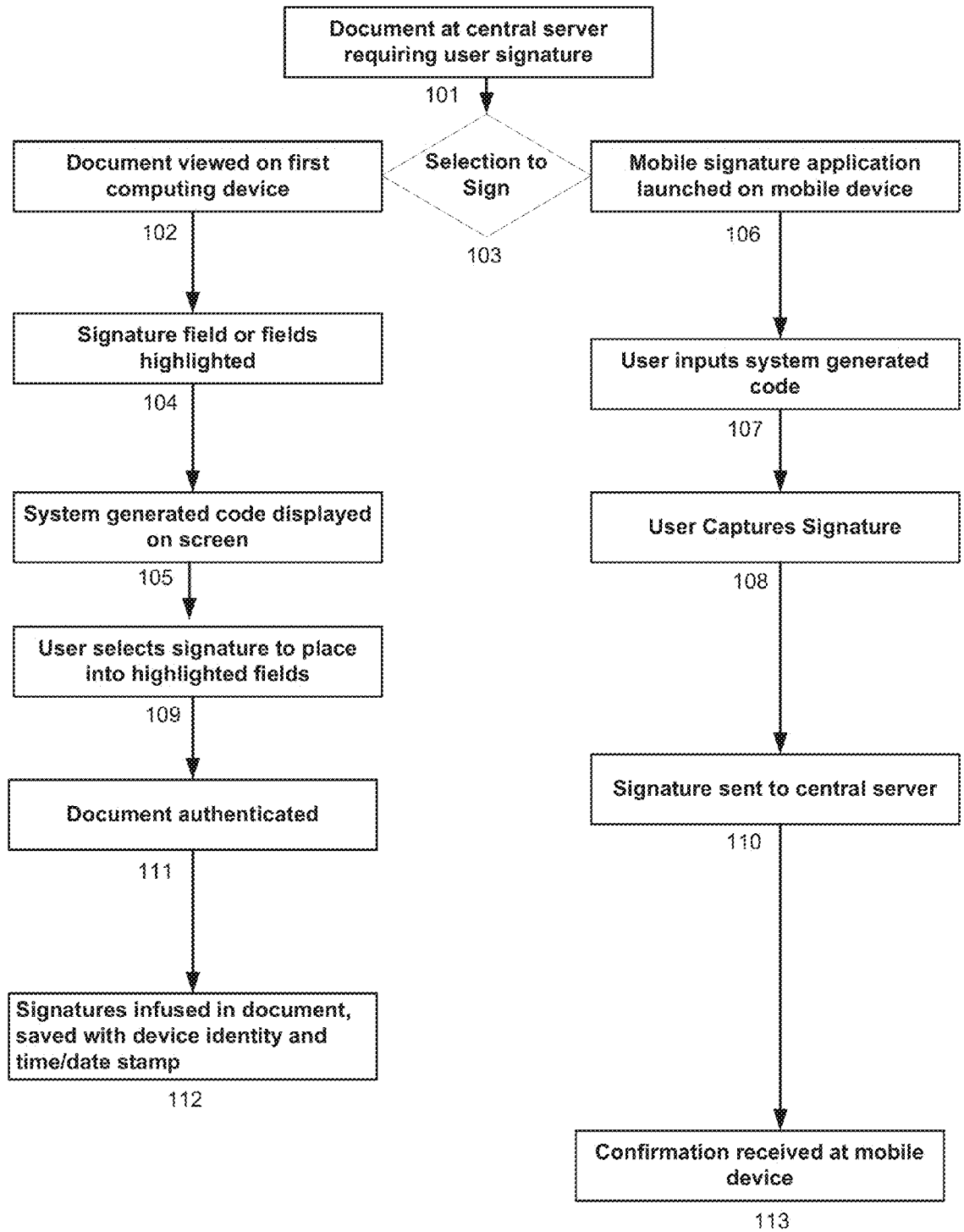
FIG. 1 is a block diagram showing the process of a user viewing a document, receiving a security code, capturing a signature on a mobile device, sending the signature and security code from the mobile device to the central server, and receiving a confirmation code on the mobile device.

Referring to the block diagram described in FIG. 1, the first step involves the storing of a document on a central server that requires a signature 101. Now referring to FIG.

2 the system consists of the central server 201, a first computing device 202, and a second device which is a mobile computing or mobile communications device 203. In some embodiments, the first computing device and second mobile computing device may be one and the same device.

Figure 2:
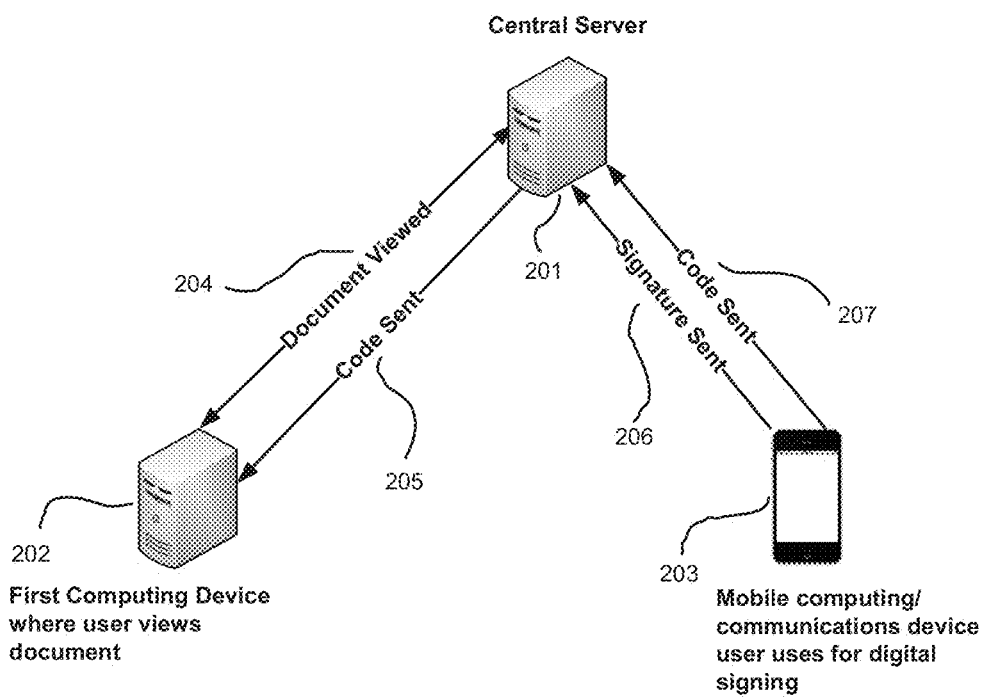
FIG. 2 is a diagram showing the components of the system: the central server, first computing device, and second mobile computing device. Also shown is the process where the user views the document and the central server sends a unique alphanumeric code, and the mobile device user sends a signature and the unique alphanumeric code.
Figure 3:
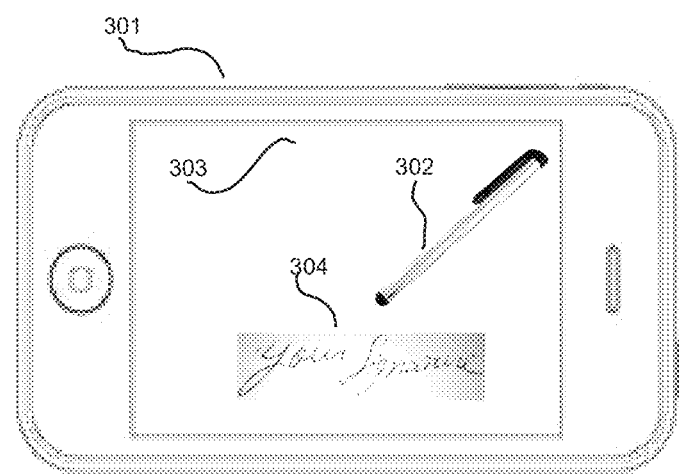
FIG. 3 shows a signature created by the use of an input device such as a stylus, where the user creates a signature on the screen of the device and saves for future use.
Figure 4:
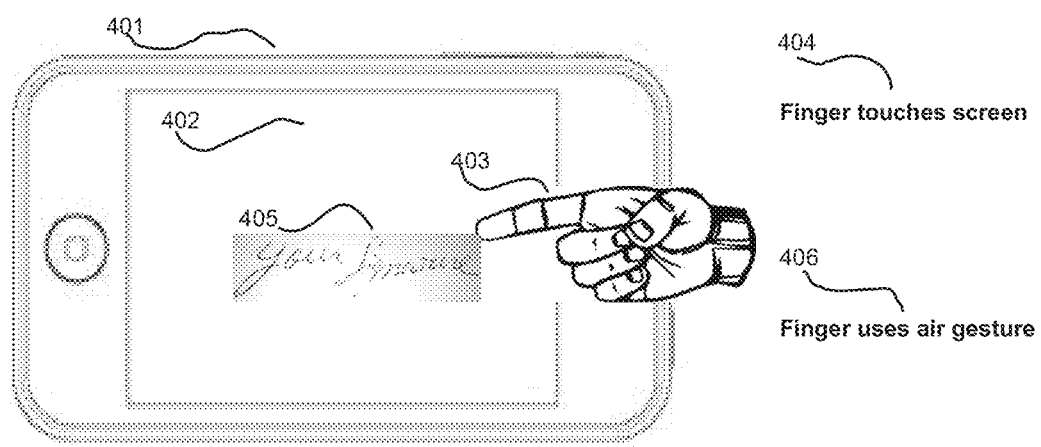
FIG. 4 shows a signature being created by using a finger on the touchscreen of a mobile device, or by the use of air gesturing on the mobile device wherein the finger does not actually touch the screen. The signature image is created and then saved for future use.
Figure 5:
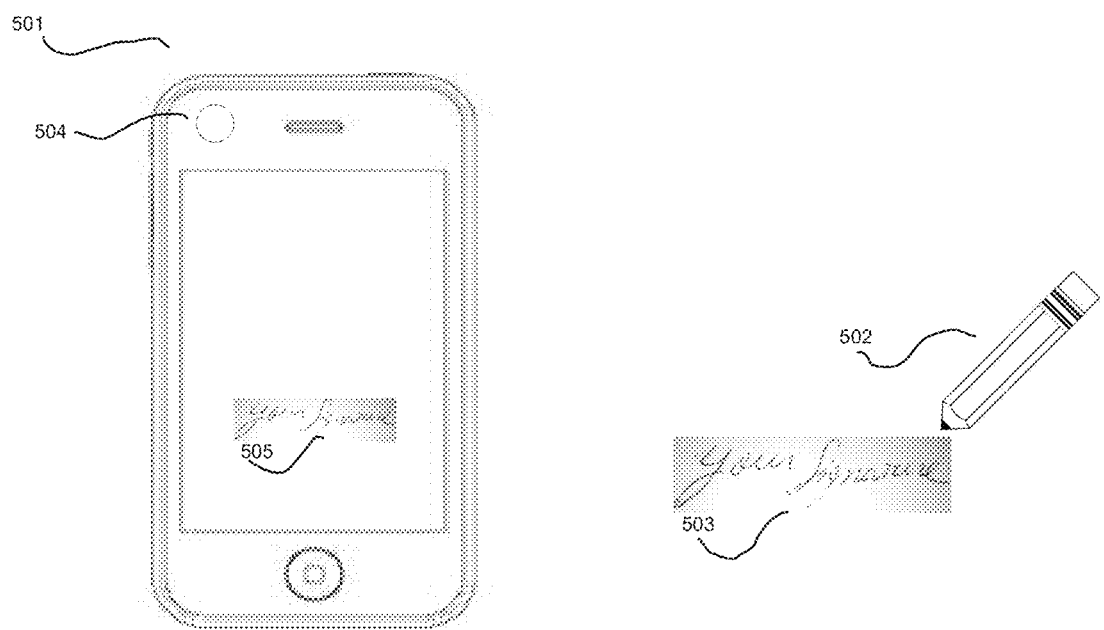
FIG. 5 shows a signature being created by signing a piece of paper with a pen or pencil and using the camera function of a mobile device to take a picture of the signature which then displays and saves the signature image on the mobile device.
Figure 6:
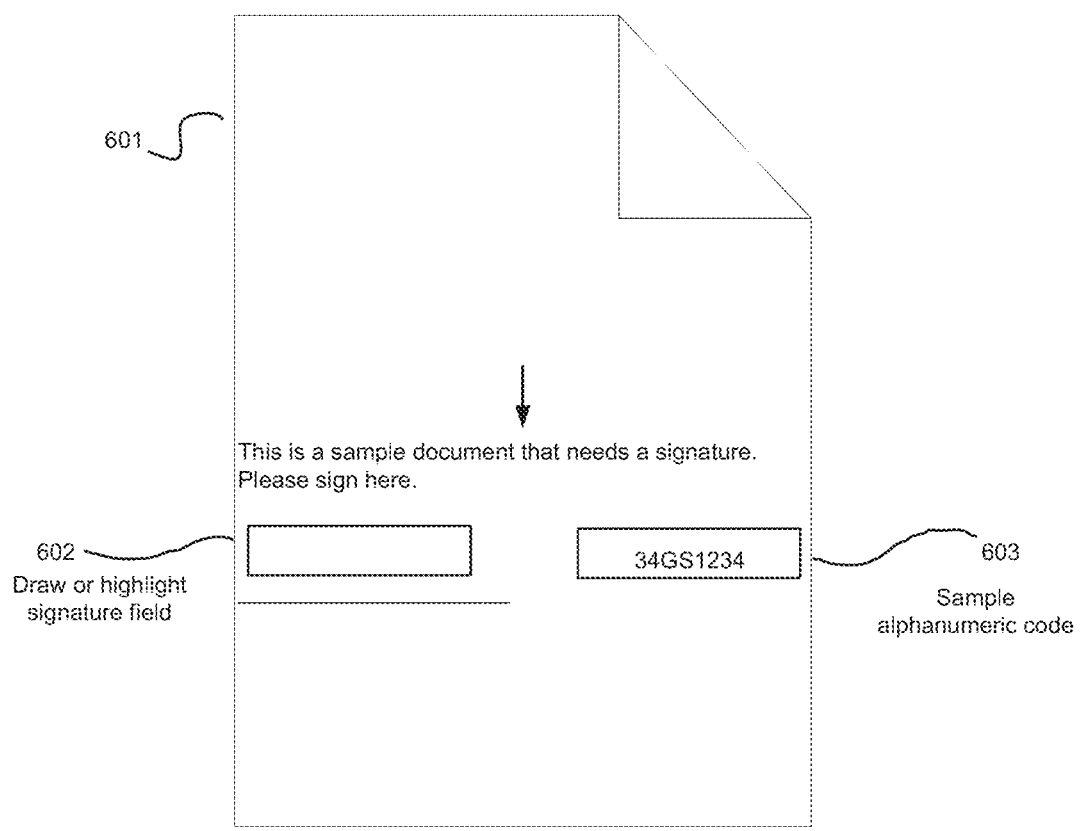
FIG. 6 shows a sample document that a user would view on a first computing system. The user would view the document, draw or highlight a box where the signature goes, and view an alphanumeric code that is sent from the central server.

Per instructions from the signature service subscriber, instructions are sent to the person whose signature is needed, and access is given for that person to view the document 601 on a first computing device, 102 in FIGS. 1 and 204 in FIG. 2. The user will select to sign 103 the document, and will highlight the one or more signature fields 104 or draw a box at the signature field 602. At that point, a system generated unique alphanumeric code 105 is generated and displayed, 205 in FIGS. 2 and 603 in FIG. 6, on the users first computing device. The alphanumeric code is a unique code that the user will input into their second mobile computing device as verification that the user is indeed providing the electronic signature.

The user will then launch an application, or applet 107, on the mobile computing device and capture a signature 108 by one of various methods. One method is to use an input device such as a stylus 302 to sign directly on the touchscreen 303 of the mobile computing device 301, thus creating a signature image 304 that is viewed then saved for future use.

Another method to create a signature is for the user to sign on the touchscreen 402 of the mobile device 401 by using a finger 403 that directly touches the screen 404 and creates a signature image 405 that is viewed and saved for future use. A variation of this method is for the user to use a finger 403 and "sign" a signature by using air gesturing 406 without actually touching the screen 402 of the mobile computing device 401.

Another method to create a signature is for the user to sign on paper using a pen or pencil 502 creating a paper signature 503. The user then uses the camera function 504 of the mobile computing device 501 to capture a picture of the signature image 503 that is then displayed on the device screen 505 and saved for future use.

After a signature is created, the user (signer) inputs the unique alphanumeric code 107 on the mobile device, and the mobile device application then sends the signature and code to the central server, 110 in FIGS. 1 and 206 in FIG. 2.

The central server authenticates the document 111, infuses the signature into the document with the mobile device identity and time and date stamp of the action 112, then finally sends a confirmation code to the mobile device 113.

I claim:

1. A system for embedding an electronic signature into a digital document comprising;
    computing device having a first screen for viewing the digital document;
    a software application on a mobile computing device enabling a user to highlight a signature field;
    a central server storing the digital document for the user;
    an alphanumeric code from the central server on the computing device having a first screen;
    a mobile computing device having a second screen for inputting the alphanumeric code, the code representing approval by the user to use a pre-stored signature in the highlighted signature field;
    the software application adapted to transmit the electronic signature, an input code, a user identity, and mobile computing device identification information to the central server;
    the input code, the user identity, the mobile computing device identification information, and a time stamp and a date stamp infused into the associated digital document,
    wherein the software application is adapted to generate the electronic signature from an input device having a touchscreen or through the use of air gestures whereby the electronic signature is generated without touching the touchscreen;
    wherein the software application is adapted to operate a camera function of the mobile computing device, enabling the user to take a picture of the electronic signature and later store the electronic signature for future use; and,
    wherein the software application is adapted to allow the user to input the alphanumeric code on the mobile computing device via a keyboard, a touchscreen, or by way of air gestures.

2. The system as described in claim 1 wherein the digital document is stored on the central server and made available for viewing by the user on the computing device having a first screen.

3. The system as described in claim 1 further comprising a software program on computer readable medium operating on the central server the software program adapted to associate the digital document with an intended recipient, generate an alphanumeric code for user verification, and provide the user the capability to view the digital document and alphanumeric code on the computing device having a first screen.

4. The system as described in claim 3 wherein the software program is adapted to authenticate the user via confirmation of the alphanumeric code and the mobile communication device identification or mobile computing device identification information.

5. The system as described in claim 4 wherein further including at least one of a mobile computing device or mobile communication device identifier having any one or combination of IMEI, IMSI, RUIM, MSIN, MIN, MSID, MEID, UDID, TMSI, MNC, MSCID, GPS, MAC Address, a time and date of the electronic signature, or information provided in response to security requests of the software application.

6. The system as described in claim 1 wherein the software application is adapted to prompt the user to authenticate, approve, and insert the electronic signature in one or more locations within in one or more documents, the user enabled to draw or highlight a box of the signature field; wherein the user activates the signature field by clicking, selecting, tapping or touching.

7. The software application operating on a central server as described in claim 1 that infuses the signature in the document.

8. The system as described in claim 1, further comprising: locking the document from edits to secure the authenticity of the document.

9. The mobile computing device of claim 1 and the first computing device of claim 1 wherein the mobile computing device may be the same device as the computing device.

10. A method for embedding an electronic signature into a digital document comprising the steps of:
    viewing the digital document on a computing device having a first screen;
    highlighting a signature field;
    displaying a software program generated alphanumeric code on the computing device having a first screen;

inputting the alphanumeric code on a mobile computing device having a second screen, the code representing approval by a user to use a pre-stored signature in the highlighted signature field;

transmitting the electronic signature from a software application on the mobile computing device and any one or combination of an input code, a user identity, mobile computing device identification or mobile communication device identification information to a central server;

infusing the electronic signature from the central server and any one or combination of the input code, the user identity, the mobile computing device identification or the mobile communication device identification information, and a time and date stamp into the digital document;

wherein the software application is adapted to generate the electronic signature from an input device having a touchscreen or through the use of air gestures whereby the electronic signature is generated without touching the touchscreen;

wherein the software application is adapted to operate a camera function of the mobile computing device, enabling the user to take a picture of the electronic signature and later store the electronic signature for future use; and, wherein the software application is adapted to allow the user to input the alphanumeric code on the mobile computing device via a keyboard, a touchscreen, or by way of air gestures.

11. The method as described in claim 10 wherein the digital document is stored on the central server and made available for viewing by the user on the computing device having a first screen.

12. The method as described in claim 10 further comprising enabling a software program on computer readable medium operating on the central server, the software program adapted to associate the digital document with an intended recipient, generate the alphanumeric code for user verification, and provide the user the capability to view the digital document and alphanumeric code on the computing device having a first screen.

13. The method as described in claim 12 further comprising authenticating the user via confirmation of the alphanumeric code and the mobile computing device identification or the mobile communication device identification information and the software application; wherein the mobile communication device identification or the mobile communication device identification information comprises any one or combination of IMEI, IMSI, RUIM, MSIN, MIN, MSID, UDID, TMSI, MNC, MEID, MSCID, GPS, MAC Address, time and date of the electronic signature, or information provided in response to security requests of the software application.

14. The method as described in claim 10 wherein the software application is adapted to draw or highlight a box of the signature field and further adapted to authenticate, approve, and insert the electronic signature in one or more locations within one or more digital documents, the user activating the signature field by clicking, selecting, tapping or touching.

15. The method as described in claim 10 wherein the software application infuses the electronic signature in the digital document and further locks the digital document from edits to secure an authenticity of the digital document.

* * * * *